Figure 6:
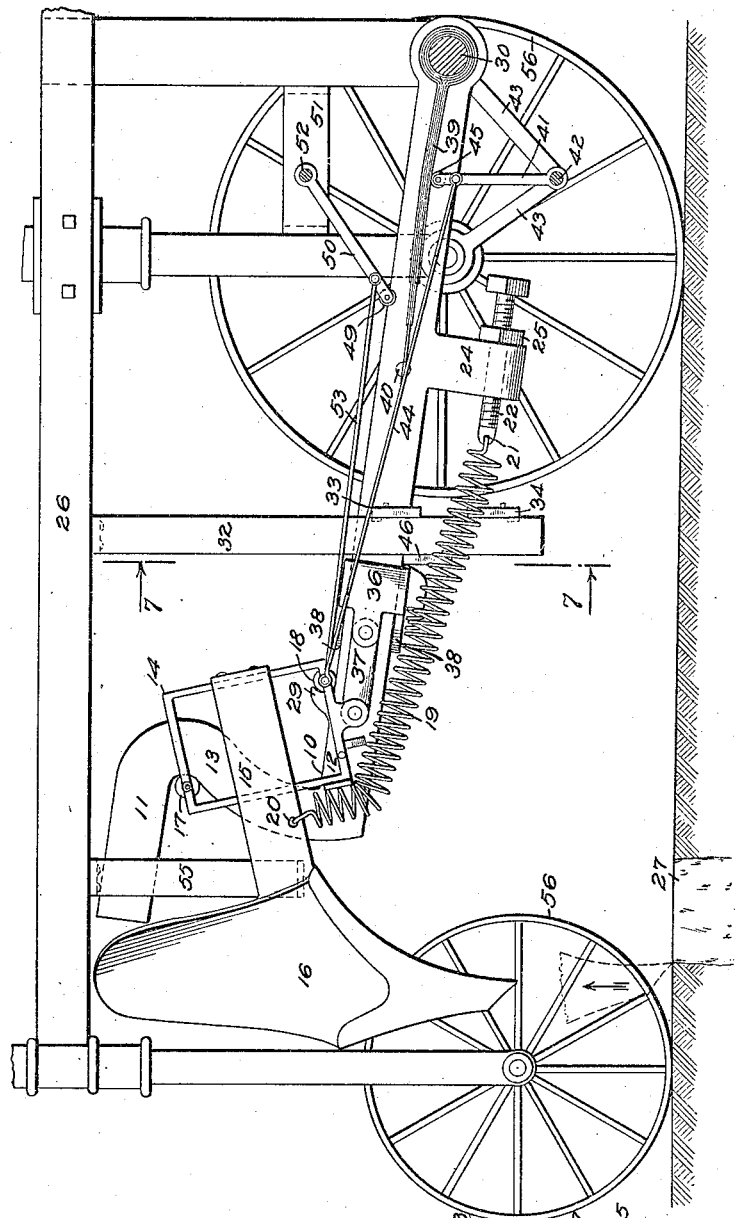

E. DUNLAP.
YIELDING MOUNT FOR PLOWS AND OTHER TOOLS.
APPLICATION FILED JUNE 7, 1915.
1,174,699.
Patented Mar. 7, 1916.
3 SHEETS—SHEET 1.
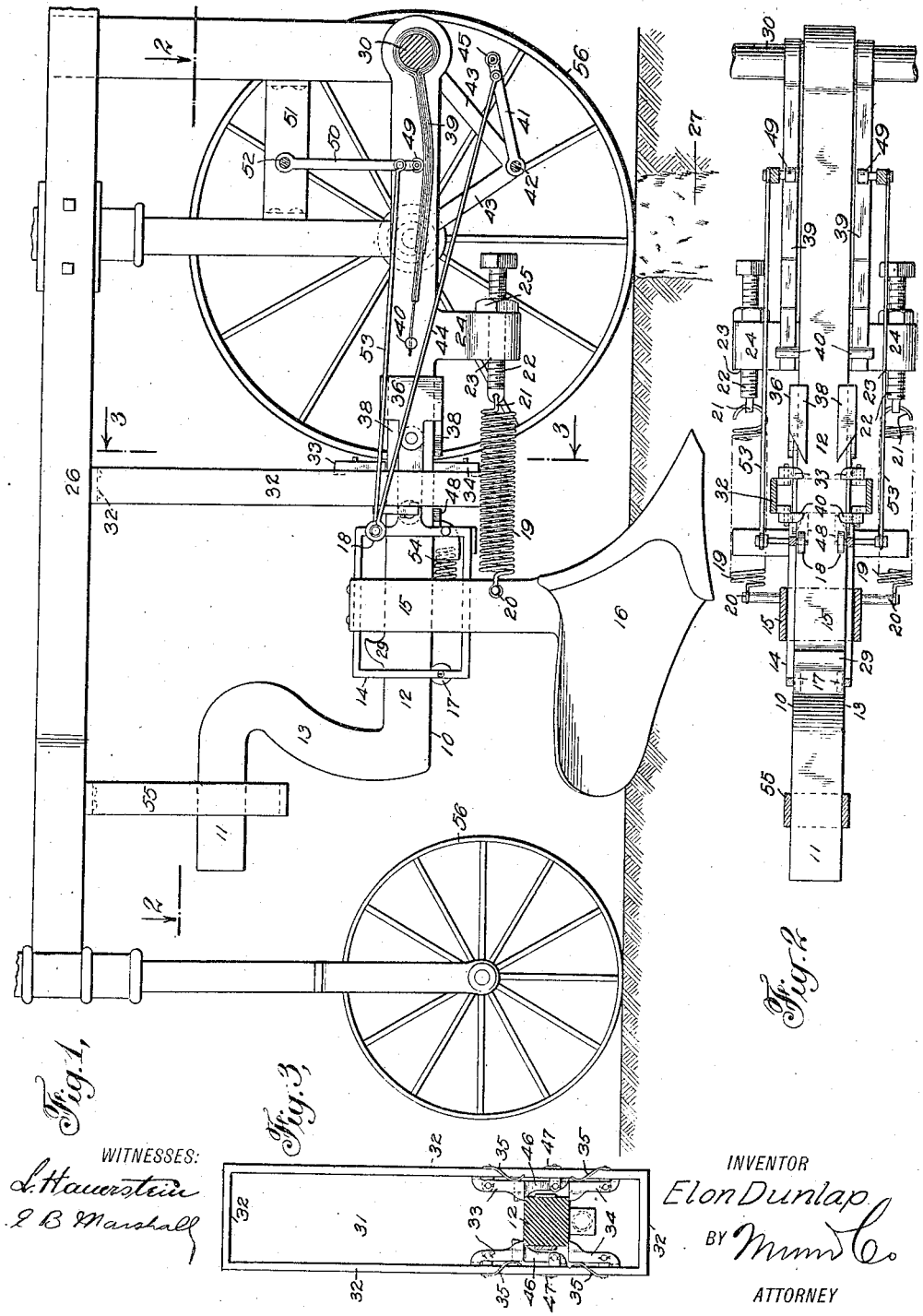
WITNESSES:
L. Hauerstein
I. B. Marshall
INVENTOR
Elon Dunlap
BY Munn & Co.
ATTORNEY E. DUNLAP.
YIELDING MOUNT FOR PLOWS AND OTHER TOOLS.
APPLICATION FILED JUNE 7, 1915.
1,174,699.
Patented Mar. 7, 1916.
3 SHEETS—SHEET 2.
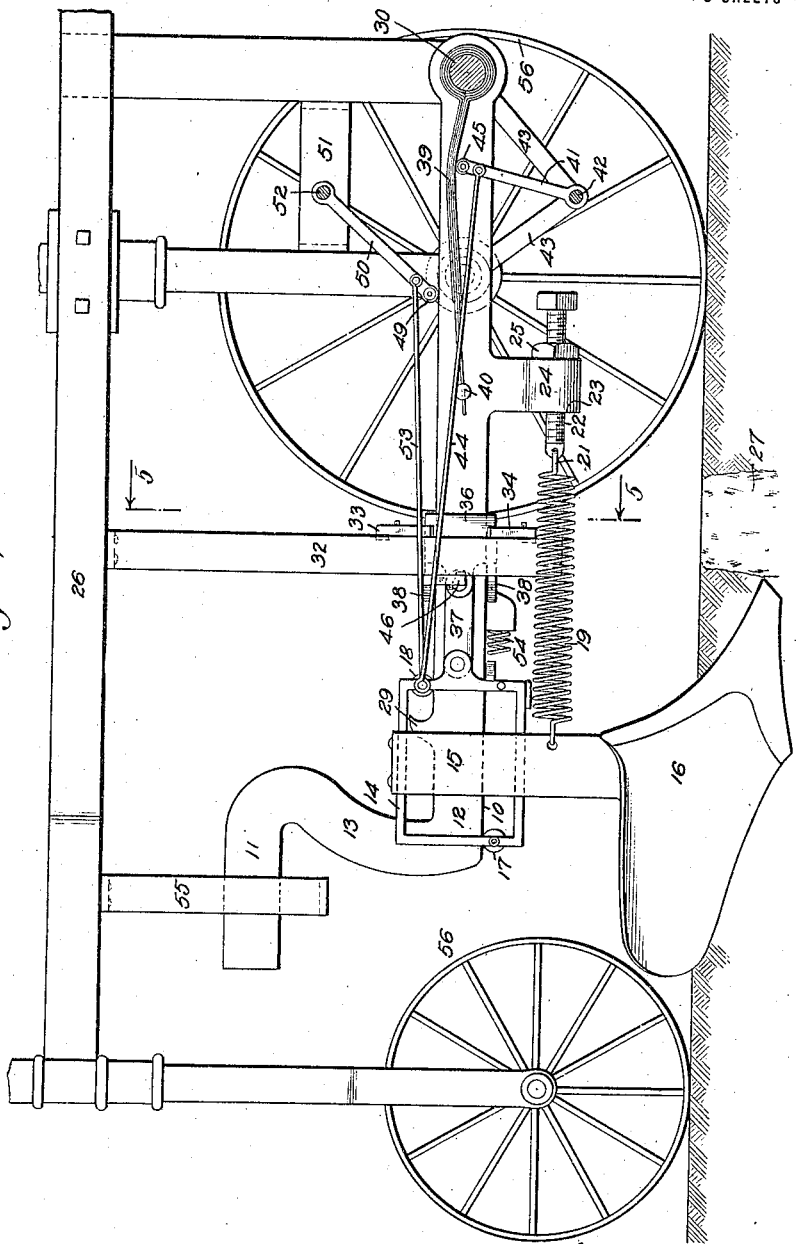
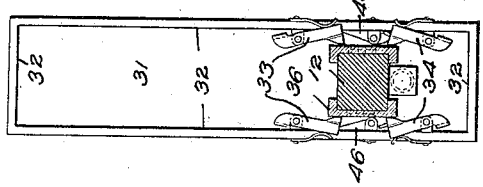

E. DUNLAP.
YIELDING MOUNT FOR PLOWS AND OTHER TOOLS.
APPLICATION FILED JUNE 7, 1915.

1,174,699.

Patented Mar. 7, 1916.
3 SHEETS—SHEET 3.

WITNESSES:
S. Hauerstein
E. B. Marshall

INVENTOR
Elon Dunlap
BY
ATTORNEY

UNITED STATES PATENT OFFICE.

ELON DUNLAP, OF DIAMOND SPRING, CALIFORNIA.

YIELDING MOUNT FOR PLOWS AND OTHER TOOLS.

1,174,699.

Specification of Letters Patent.

Patented Mar. 7, 1916.

Application filed June 7, 1915. Serial No. 32,536.

*To all whom it may concern:*

Be it known that I, ELON DUNLAP, a citizen of the United States, and a resident of Diamond Spring, in the county of Eldorado and State of California, have invented a new and Improved Yielding Mount for Plows and other Tools, of which the following is a full, clear, and exact description.

My invention has for its object to provide a mount for plows and other tools, which will permit the plow or other tool to pass over an obstruction, such as a stump or rock, and still make it impossible for the plow or other tool to be drawn out of line when passing through an obstruction of less resistance, such as a hard spot in the soil. The plow or other tool is held in normal position by resilient means, the tension of which increases with the pull up to a predetermined point, when the further movement of the plow or other tool may take place more readily. This resilient means may be so adjusted that the point where the resistance of the plow or other tool becomes less, may be set at a predetermined number of pounds draft or changed as desired.

Another object of the invention is to provide a spring for holding the plow or other tool in normal position, which permits the movement of the plow out of normal position when the strain becomes excessive. In addition to the spring, pawls are provided for holding the plow or other tool rigid in normal position and also for holding the plow or other tool out of normal position until an obstruction has been passed. The plow or other tool will return immediately to normal position and in alinement after the passing of the obstruction.

Additional objects of the invention will appear in the following specification, in which the preferred form of my invention is disclosed.

In the drawings similar reference characters refer to similar parts in all the views, in which my invention is illustrated as applied to a plow.

Figure 7:
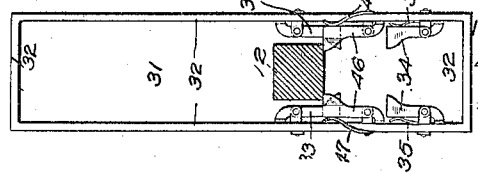

Figure 1 is a side elevation of a plow, illustrating my invention, parts being shown in section; Fig. 2 is a sectional view on the line 2—2 of Fig. 1; Fig. 3 is a sectional view on the line 3—3 of Fig. 1; Fig. 4 is a view, similar to that shown in Fig. 1, but with the plow moved rearwardly against the tension of the spring; Fig. 5 is a sectional view on the line 5—5 of Fig. 4; Fig. 6 is a side elevation in section, similar to that shown in Fig. 1, but with the plow rotated rearwardly to pass over a stump or other obstruction; and Fig. 7 is a sectional view on the line 7—7 of Fig. 6.

It will be understood that the tool carrier, which is used in my invention, may be used for supporting not only a plow, but many other types of tools, and while it will also be understood that a plurality of mountings may be supported by a single frame, so that a gang of plows may be operated by the same power, the drawings merely show my invention as applied to a single plow. However, it will be understood that the principle is the same whether one or more plows are mounted on the frame, or whether other tools are substituted for the plows, one of which is shown in the drawings.

It will be seen by referring to the drawings, that a beam 10 is provided, having portions 11 and 12, which are disposed substantially parallel with each other, the portion 11 above the portion 12, these portions being connected by a curved portion 13, the center line of which is disposed at acute angles relatively to the portions 11 and 12 of the beam 10. Mounted for traveling longitudinally on the portion 12 of the beam 10, there is a carriage 14, which serves as a tool carrier, a head 15 on a plow 16 being secured to this carriage 14 as indicated in the drawings. The carriage 14 may have several rollers for engaging the beam 10, but in most cases, it will be found to be sufficient, if there is a roller 17 at the bottom of the carriage 14 at its rear and rollers 18 at the front of the carriage 14 and resting on the beam 10. The plow 16 with its head 15 and the carriage 14 are held yieldingly forward by a spring 19 which is secured at its end 20 to the head 15 and at its end 21 to a screw 22, which meshes in the threaded orifice 23 on a depending ear 24 on the beam 10. It will be seen that by turning the screw 22, the tension of the spring 19 may be adjusted and that when adjusted, the screw 22 may be held in its position by the lock nut 25, which meshes with the thread on the screw 22.

It will be seen that the plow 16 with its head 15 and the carriage 14 may be moved along the longitudinal line of the frame 26 under normal conditions and that the plow 16 will be held in alinement, even should the plow strike some very hard ground. Should the plow 16 strike a stump 27 or other unusual obstruction, it will be moved rearwardly from normal position, or until the rollers 18 on the carriage 14 strike a stop 29 at the top of the portion 12 of the beam 10. This will check the rearward movement of the upper portion of the carriage 14 and under the influence of the stump or other obstruction 27, the plow 16 will be rotated to the rear of the portion 13 of the beam 10, as illustrated in Fig. 6 of the drawings.

Fig. 4 of the drawings, illustrates the rearward movement of the plow 16 with its head 15 and the carriage 14 under normal conditions, and as stated, Fig. 6 illustrates the rotary movement of the carriage 14 and the plow 16 when the plow strikes an unusual obstruction. The axis of rotation of the carriage 14 and the plow 16 when the plow moves rearwardly of the portion 12 of the beam 10, is the stop 29 and the rollers 18 on the carriage 14. The beam 10 is pivoted at its forward end to a transverse stud 30 secured to members of the frame 26, the portion 12 of the beam 10 being disposed in a guideway 31, formed by the rectangular members 32, which are secured to the underside of the frame 26. It will therefore be seen that any lateral movement of the beam 10 relatively to the frame 26 will be prevented. The portion 12 of the beam 10 is normally held rigid relatively to the frame 26, in the position indicated in Fig. 1 of the drawings, by pawls 33 and 34, the pawls 33 engaging the upper side of the portion 12 of the beam and the pawls 34 engaging the bottom of the said portion 12 of the beam. These pawls 33 and 34 are held yieldingly in this position by the springs 35. Secured for sliding on the portion 12 of the beam 10, there is a sleeve 36, which is connected by links 37 with the carriage 14, so that it will be moved therewith. This sleeve 36 carries two upper and two lower wedges 38, which are disposed in front of the pawls 33 and 34 and which engage the pawls 33 and 34 to push them away from each other when the sleeve 36 is moved rearwardly with the rearward movement of the carriage 14. This being so, when the carriage 14 moves rearwardly from normal position and when the rollers 18 on the carriage engage the stop 29, the wedges 38 on the sleeve 36, free the pawls 33 and 34 from the portion 12 of the beam 10, so that the beam 10 is free to be moved vertically relatively to the frame 26, this freedom of movement being important in order that the plow 16 may disengage itself from the stump or other obstruction 27. However, as it is important that the beam 10 be moved upwardly with the plow 16, to make certain that the plow 16 become disengaged from the stump or other obstruction 27, I provide one or more leaf springs 39, which are mounted on the transverse stud 30 and which are disposed rearwardly and are secured to the portion 12 of the beam 10, at 40. In connection with this spring 39, I provide an arm 41 pivoted at 42 to members 43 of the frame, this arm 41 being connected with the carriage 14 by a link 44 and being held forwardly by the said carriage 14 and the link 44 when the carriage 14 is in normal position. However, when the carriage 14 moves rearwardly out of normal position and is rotated as indicated in Fig. 6 of the drawings, it pulls the link 44 rearwardly thereby bringing the roller 45 on the arm 41 into engagement with the underside of the spring 39 to press the spring 39 upwardly, thereby serving to raise the beam 10 to a position where it will be disposed above the pawls 46 to be supported thereby, these pawls being mounted on the side members 32 of the guideway 31 and being held yieldingly in position by the spring 47. In this position the plow 16 will be supported until the obstruction has been passed, when the spring 19 will pull forwardly the carriage 14 and with it, the plow 16, the wedges 48 on the carriage 14 engaging the pawls 46 to push the said pawls 46 out of contact with the beam 10, when the beam 10 will be pushed downwardly not only by gravity, but by the spring 39 under the influence of the roller 49 mounted on the arm 50, which is pivoted to a member 51 of the frame at 52, this arm 50 being moved forwardly by the link 53 which connects the carriage 14 with the said arm 50. At the same time, the arm 41 is moved forwardly as indicated in Fig. 1 of the drawings, with its roller 45 out of contact with the spring 39. In this manner the beam 10 and the carriage 14 with the plow or other tool 16 is brought back to normal position, a buffer spring 54 being mounted below the portion 12 of the beam 10 for engagement by the head 15 of the plow 16, to lessen the shock.

It will of course be understood that when the arm 41 is moved rearwardly, so that its roller 45 will engage the spring 39 to raise the beam 10, that the arm 50 will be moved rearwardly by its link 53, so that its roller 49 will be out of engagement with the spring 39. In the drawings, I show two springs 39, one disposed at each side of the beam 10 and a pair of arms 50 disposed above the springs 39 and a pair of arms 41 disposed below the said springs. The portion 11 of the beam 10 is disposed in a vertical guideway 55. The frame 26 is mounted on wheels 56, so that it may be readily drawn by draft animals or a traction engine.

Having thus described my invention, I claim as new and desire to secure by Letters Patent:—

1. In a yielding mount, a beam, a tool-carrying means mounted to slide longitudinally on the beam, and means for automatically raising the beam on the movement of the tool-carrying means thereon.

2. In a yielding mount, a frame, a beam movable relatively to the frame, a tool-carrying means mounted to slide longitudinally on the beam, means for holding the beam relatively to the frame, and means for releasing the second mentioned means on the movement of the tool-carrying means to a predetermined position on the beam.

3. In a yielding mount, a beam, a tool-carrying means mounted to slide on the beam to a position where it may rock thereon, resilient means for holding the tool-carrying means away from the said position, and means for automatically moving the beam on the rocking of the tool-carrying means relatively to the beam.

4. In a yielding mount, a beam, a tool-carrying means mounted to slide on the beam to a position where it may rock thereon, resilient means for holding the tool-carrying means away from the said position, and means for automatically raising the beam on the rocking of the tool-carrying means on the beam in one direction and for lowering the beam on the rocking of the tool-carrying means on the beam in an opposite direction.

5. In a yielding mount, a frame, a tool-carrying means movable longitudinally of the frame, and means free from the ground for automatically raising the tool-carrying means on the movement of the latter longitudinally of the frame.

6. In a yielding mount, a tool-carrying means, a beam on which the said means is slidably mounted, the beam preventing the rotation of the means thereon in advance of a predetermined point, resilient means for yieldingly holding the tool-carrying means in advance of the said predetermined point, and means for automatically raising the beam on the rearward movement of the tool-carrying means thereon.

7. In a yielding mount, a frame, a beam mounted on the frame, a tool-carrying means slidably mounted on the beam and rotatable at a predetermined point thereon, resilient means for yieldingly holding the tool-carrying means away from the said predetermined point, and automatic means for raising the beam relatively to the frame at a predetermined point in the movement of the tool-carrying means against the tension of the resilient means.

8. In a yielding mount, a beam having two portions disposed at an angle to each other, a tool-carrying means slidably mounted on the beam for moving from one portion of the beam to the other portion, and resilient means for yieldingly holding the tool-carrying means in a predetermined position on the beam.

9. In a yielding mount, a beam having two portions disposed at an angle to each other, a tool-carrying means slidably mounted on the beam for moving from one portion of the beam to the other portion, and resilient means for yieldingly holding the tool-carrying means away from the apex of the angle.

10. In a yielding mount, a frame, a beam having two portions disposed at an angle to each other, a tool-carrying means slidably mounted on the beam for moving from one portion of the beam to the other, resilient means for yieldingly holding the tool-carrying means in a predetermined position on the beam, and means for automatically moving the beam relatively to the frame on the movement of the tool-carrying means to a predetermined point on the beam.

11. In a yielding mount, a frame, a beam having two portions disposed at an angle to each other, a tool-carrying means slidably mounted on the beam for moving from one portion of the beam to the other, resilient means for yieldingly holding the tool-carrying means in a predetermined position on the beam, and means for automatically moving the beam relatively to the frame in one direction on the movement of the tool-carrying means along the beam in one direction and for automatically moving the beam in another direction on the movement of the tool-carrying means along the beam in an opposite direction.

12. In a yielding mount, a frame, a beam movable relatively to the frame, a tool-carrying means movably mounted on the beam, means for holding the beam rigidly relatively to the frame, and means for releasing the second-mentioned means on the movement of the tool-carrying means to a predetermined position on the beam.

13. In a yielding mount, a frame, a beam movable relatively to the frame, a tool-carrying means movably mounted on the beam, means for holding the beam relatively to the frame, means for releasing the second-mentioned means on the movement of the tool-carrying means to a predetermined position on the beam, and means for moving the beam relatively to the frame on its release by the second-mentioned means.

14. In a yielding mount, a frame, a beam movable relatively to the frame, a tool-carrying means movably mounted on the beam, means for holding the beam in a predetermined position relatively to the frame, means for releasing the second-mentioned means on the movement of the tool-carrying means in one direction on the beam, means for moving the beam relatively to the frame on its release by the second-mentioned means, means for holding the beam relatively to the frame in another position on its movement by the fourth-mentioned means, and means to release the fifth-mentioned means on the movement of the tool-carrying means in an opposite direction.

15. In a yielding mount, a frame, a beam movable relatively to the frame, a tool-carrying means movably mounted on the beam, means for holding the beam in a predetermined position relatively to the frame, means for releasing the second-mentioned means on the movement of the tool-carrying means in one direction on the beam, means for moving the beam relatively to the frame on its release by the second-mentioned means, means for holding the beam relatively to the frame in another position on its movement by the fourth-mentioned means, means to release the fifth-mentioned means on the movement of the tool-carrying means in an opposite direction, and resilient means for yieldingly holding the tool-carrying means in a predetermined position relatively to the beam.

16. In a yielding mount, a beam, a tool-carrying means slidably mounted on the beam and rotatable at a predetermined point thereon, resilient means for yieldingly holding the tool-carrying means away from the said predetermined point, means for holding the beam relatively to the frame, and means for releasing the third-mentioned means on the movement of the tool-carrying means to a predetermined position on the beam.

17. In a yielding mount, a beam having a stop, a tool-carrying means slidably mounted on the beam and having a member for engaging the stop to serve as axis of rotation on the movement of the member against the stop, and resilient means for yieldingly holding the tool-carrying means with its member away from the stop.

18. In a yielding mount, a beam having two parts disposed at an angle to each other and with a stop on one of the parts, a tool-carrying means slidably mounted on the beam and having a member for engaging the stop to serve as an axis of rotation on the movement of the tool-carrying means around the apex of the angle formed by the said two parts of the beam, and resilient means for yieldingly holding the tool-carrying means with its member away from the stop.

19. In a yielding mount, a frame, a beam movable relatively to the frame, having two parts disposed at an angle to each other, there being a stop on one of the parts of the beam, a tool-carrying means slidably mounted on the beam and having a member for engaging the stop to serve as an axis of rotation on the movement of the tool-carrying means around the apex of the angle formed by the two said parts of the beam, means for holding the beam in a predetermined position relatively to the frame, means for releasing the second-mentioned means on the movement of the tool-carrying means in one direction on the beam, means for moving the beam relatively to the frame on its release by the second-mentioned means, means for holding the beam relatively to the frame in another position on its movement by the fourth-mentioned means, and means to release the fifth-mentioned means on the movement of the tool-carrying means in an opposite direction.

20. In a yielding mount, a frame, a beam movable relatively to the frame and having two parts disposed at an angle to each other, there being a stop on one of the parts of the beam, a tool-carrying means slidably mounted on the beam and having a member for engaging the stop to serve as an axis of rotation on the movement of the tool-carrying means around the apex of the angle formed by the two said parts of the beam, means for holding the beam in a predetermined position relatively to the frame, means for releasing the second mentioned means on the movement of the tool-carrying means in one direction on the beam, means for moving the beam relatively to the frame on its release by the second-mentioned means, means for holding the beam relatively to the frame in another position on its movement by the fourth-mentioned means, means to release the fifth-mentioned means on the movement of the tool-carrying means in an opposite direction, and resilient means for yieldingly holding the tool-carrying means in a predetermined position relatively to the beam.

21. In a yielding mount, a frame, a beam having two parts disposed at an angle to each other and with a stop on one of the parts, the beam being movable relatively to the frame, a tool-carrying means slidably mounted on the beam and having a member for engaging the stop to serve as an axis of rotation on the movement of the tool-carrying means around the apex of the angle formed by the said two parts of the beam, means for holding the beam relatively to the frame, means for releasing the second-mentioned means on the movement of the tool-carrying means to a predetermined position on the beam, and resilient means for holding the tool-carrying means at a predetermined point on the beam.

22. In a yielding mount, a beam having two parts disposed at an angle to each other and with a stop on one of the parts, a tool-carrying means slidably mounted on the beam and having a member for engaging the stop to serve as an axis of rotation on the movement of the tool-carrying means around the apex of the angle formed by the said two parts of the beam, resilient means for holding the tool-carrying means at a predetermined point on the beam, and means for moving the beam relatively to the frame on the movement of the tool-carrying means along the beam.

23. In a yielding mount, a beam having two parts disposed at an angle to each other and with a stop on one of the parts, tool-carrying means slidably mounted on the beam, having a member for engaging the stop to serve as an axis of rotation on the movement of the tool-carrying means around the apex of the angle formed by the said two parts of the beam, resilient means for holding the tool-carrying means in a predetermined position on the beam, means for moving the beam in one direction relatively to the frame on the movement of the tool-carrying means in one direction, and means for moving it back in an opposite direction on the movement of the tool-carrying means in an opposite direction on the beam.

24. In a yielding mount, a frame, a beam movable relatively to the frame, a pawl on the frame for engaging the beam to hold the beam in a predetermined position, a tool-carrying means slidably mounted on the beam, means carried by the first means for releasing the beam, and resilient means for yieldingly holding the tool-carrying means in a predetermined position.

25. In a yielding mount, a frame, a beam movable relatively to the frame, a pawl on the frame for engaging the beam to hold the beam in a predetermined position, a tool-carrying means slidably mounted on the beam, means operable by the first means for releasing the beam, resilient means for yieldingly holding the tool-carrying means in a predetermined position, and means operable by the tool-carrying means for moving the beam relatively to the frame.

26. In a yielding mount, a frame, a beam movable relatively to the frame, pawls for engaging opposite sides of the beam to prevent its movement relatively to the frame, a tool-carrying means slidably mounted on the beam, resilient means for holding the tool-carrying means yieldingly relatively to the frame, and means operable by the tool-carrying means for moving the pawls out of engagement with the beam.

27. In a yielding mount, a frame, a beam movable relatively to the frame, pawls for engaging opposite sides of the beam to prevent its movement relatively to the frame, a tool-carrying means slidably mounted on the beam, resilient means for holding the tool-carrying means yieldingly relatively to the frame, means operable by the tool-carrying means for moving the pawls out of engagement with the beam, means operable by the tool-carrying means for moving the beam relatively to the frame on the release of the beam by the said pawls, an additional pawl for holding the beam relatively to the frame after its said movement, and means operable by the tool-carrying means for the release of the said additional pawl.

28. In a yielding mount, a frame, a beam pivoted to the frame, two arms pivoted on opposite sides of the beam with their axes substantially parallel with the axis of the beam, a leaf spring mounted substantially at the pivot of the beam, the leaf spring being secured to the beam at a distance from its pivot and being engaged on opposite sides by said arms, one at a time, a tool-carrying means slidably mounted on the beam, links connecting the tool-carrying means with the arms, and resilient means for yieldingly holding the tool-carrying means in a predetermined position relatively to the beam.

29. In a yielding mount, a frame, a beam pivoted to the frame, two arms pivoted on opposite sides of the beam with their axes substantially parallel with the axis of the beam, a leaf spring mounted substantially at the pivot of the beam, the leaf spring being secured to the beam at a distance from its pivot and being engaged on opposite sides by the arms, one at a time, a tool-carrying means slidably mounted on the beam and rotatable at a predetermined point thereon, links connecting the tool-carrying means with the arms, and resilient means for yieldingly holding the tool-carrying means away from the said predetermined point on the beam.

30. In a yielding mount, a frame, a beam having two parts disposed at an angle to each other, the beam being pivoted to the frame, two arms pivoted on opposite sides of the beam with their axes substantially parallel with the axis of the beam, a leaf spring mounted substantially at the pivot of the beam, the leaf spring being secured to the beam at a distance from its pivot and being engaged on opposite sides by the arms, one at a time, tool-carrying means slidably mounted on the beam for moving from one of its parts to the other, links connecting the tool-carrying means with the arms for operating the latter, and resilient means for holding the tool carrying means in a predetermined position relatively to the beam.

31. In a yielding mount, a frame, a beam pivoted to the frame, and provided with a stop, two arms pivoted on opposite sides of the beams with their axes substantially parallel with the axis of the beam, a leaf spring mounted substantially at the pivot of the beam and secured to the beam at a distance from its pivot, the leaf spring being engaged on opposite sides by the arms, one at a time, a tool-carrying means slidably mounted on the beam and having a member for engaging the stop to serve as an axis of rotation on the movement of the member against the stop, links connecting the tool-carrying means with the arms, and resilient means for yieldingly holding the tool-carrying means with its member away from the stop.

32. In a yielding mount, a beam having ends connected by a curved portion, the center line of which is at an acute angle relatively to the said ends, a tool-carrying means for moving along one end of the beam to and on the said curved portion, and resilient means for yieldingly holding the tool-carrying means away from the said curved portion of the beam.

33. In a yielding mount, a beam having ends connected by a curved portion, the center line of which is at an acute angle relatively to the said ends, a tool-carrying means for moving along one end of the beam to and on the said curved portion, resilient means for yieldingly holding the tool-carrying means away from the said curved portion of the beam, and guides for the ends of the beam.

34. In a yielding mount, a beam having ends connected by a curved position, the center line of which is at an acute angle relatively to the said ends, a stop on the beam adjacent its curved portion, a tool-carrying means for moving along one end of the beam to and on to the said curved portion, a member on the tool-carrying means disposed for engaging the stop to serve with the stop as an axis of rotation when the tool-carrying means moves on to the curved portion of the beam, and resilient means for yieldingly holding the tool-carrying means away from the said curved portion of the beam.

35. In a yielding mount, a frame, a beam mounted on the frame, tool-carrying means slidably mounted on the beam, resilient means mounted on the beam for yieldingly holding the tool-carrying means in a predetermined position, and means for moving the beam relatively to the frame operable by the tool-carrying means.

36. In a yielding mount, a frame, a beam movable on the frame and having horizontal and upwardly extending portions, a tool-carrying means slidable on the beam for moving from the horizontal portion to the upwardly extending portion, resilient means for yieldingly holding the tool-carrying means away from the upwardly extending portion of the beam, and automatic means for raising the beam relatively to the frame at a predetermined point in the movement of the tool-carrying means against the tension of the resilient means.

37. In a yielding mount, a beam having a horizontal portion and an upwardly extending portion at the rear of the horizontal portion, a tool-carrying means slidably mounted on the beam for moving from the horizontal portion to the upwardly extending portion of the beam, and resilient means for yieldingly holding the tool-carrying means in a predetermined position on the beam.

38. In a yielding mount, a beam, a tool-carrying means mounted to slide longitudinally of the beam and depending therefrom, and means for automatically raising the beam on the movement of the tool-carrying means relatively thereto.

39. In a yielding mount, a beam, a tool-carrying means depending therefrom and mounted to slide on a beam to a position where it may rock thereon, resilient means for holding the tool-carrying means away from the said position, and means for automatically moving the beam on the rocking of the tool-carrying means relatively to the beam.

In witness whereof I have signed my name to this specification in the presence of two subscribing witnesses.

ELON DUNLAP.

Witnesses:
M. J. WILLIAMS,
V. ARRASMITH.